United States Patent [19]
Nishii et al.

[11] Patent Number: 5,544,947
[45] Date of Patent: Aug. 13, 1996

[54] HYDRAULIC BRAKE DEVICE FOR A VEHICLE

[75] Inventors: Michiharu Nishii, Toyota; Satoshi Ishida, Chiryu, both of Japan

[73] Assignee: Aisin Seiki Kabushiki Kaisha, Kariya, Japan

[21] Appl. No.: 426,004

[22] Filed: Apr. 20, 1995

[30] Foreign Application Priority Data

Apr. 21, 1994 [JP] Japan .................................. 6-083024
May 31, 1994 [JP] Japan .................................. 6-118840

[51] Int. Cl.⁶ ...................................................... B60T 8/50
[52] U.S. Cl. ........................................ 303/116.2; 303/900
[58] Field of Search ............................... 303/900, 114.1, 303/115.1, 115.2, 115.4, 113.1, 113.5, 116.1, 116.2, 119.1

[56] References Cited

U.S. PATENT DOCUMENTS

| 4,900,102 | 2/1990 | Jonner et al. | 303/116.2 |
| 5,152,589 | 10/1992 | Ocvirk | 303/116.2 |
| 5,180,211 | 1/1993 | Weise et al. | 303/113.5 X |
| 5,441,336 | 8/1995 | Takeuchi | 303/116.1 |

FOREIGN PATENT DOCUMENTS 56-10219  3/1981  Japan .
64-47644  2/1989  Japan .
4-193658  7/1992  Japan .

*Primary Examiner*—Lee Young
*Attorney, Agent, or Firm*—Doane, Swecker & Mathis, L.L.P. Burns

[57] ABSTRACT

A hydraulic brake device for a vehicle includes a reservoir for storing brake fluid, a master cylinder for generating brake pressure corresponding to an operation force of a brake operation member of the vehicle which is connected to the reservoir, a regulator valve for generating brake pressure corresponding to an operation force of a brake operation member of the vehicle which is connected to the reservoir, a wheel brake, and a pressure control unit which connects the wheel brake to the master cylinder and connects the wheel brake to the regulator valve to control a flow into the reservoir from the wheel brake and a flow into the wheel brake from the regulator valve under an anti-lock condition. The pressure control unit includes a first valve for disconnecting the wheel brake from the master cylinder and connecting the wheel brake to the reservoir, a second valve for disconnecting the first valve from the wheel brake, a third valve for connecting the wheel brake to the regulator valve to bypass the first and second vanes, and an orifice for restricting quantity of the brake fluid which flows into the wheel brake from the regulator valve so that the quantity of brake fluid flowing through the orifice is smaller than the quantity of brake fluid which flows into the reservoir from the wheel brake through the first and second valves.

9 Claims, 12 Drawing Sheets

5,544,947

HYDRAULIC BRAKE DEVICE FOR A VEHICLE

FIELD OF THE INVENTION

This invention relates to a brake system and more particularly a hydraulic brake system for a vehicle.

BACKGROUND OF THE INVENTION

A conventional hydraulic brake device for a vehicle is disclosed in Japanese Patent No. 56(1981)-10219 and Japanese Patent Laid Open No. 64(1989)-47644. The hydraulic brake device for a vehicle disclosed in the first document mentioned above includes a reservoir for storing brake fluid, a master cylinder connected to the reservoir for generating hydraulic pressure corresponding to the brake operation force, a hydraulic power source connected to the reservoir for generating hydraulic pressure corresponding to a brake operation force, a hydraulic wheel the brake, and a pressure control device for effecting anti-lock control. The pressure control device for effecting anti-lock control usually connects the hydraulic wheel brake to the master cylinder. The pressure control device connects the hydraulic wheel brake to the hydraulic power source to control brake fluid flow into the reservoir from the hydraulic wheel brake and to control brake fluid flow into the hydraulic wheel brake from the hydraulic power source under the anti-lock control condition. The pressure control device comprises a first valve member connected to the hydraulic wheel brake for switching from the master cylinder to the hydraulic power source, a second valve member for permitting brake fluid flow into the hydraulic wheel brake from the hydraulic power source, and a third valve member for permitting brake fluid flow into the reservoir from the hydraulic wheel brake.

The hydraulic brake device disclosed in the second document identified above includes a reservoir for storing brake fluid, a master cylinder connected to the reservoir for generating hydraulic pressure corresponding to the brake operation force, a hydraulic power source connected to the reservoir for generating hydraulic pressure corresponding to the brake operation force, a first hydraulic wheel brake, and a first pressure control device for effecting anti-lock control. The first pressure control device for effecting anti-lock control usually connects the first hydraulic wheel brake to the master cylinder. The first pressure control device connects the first hydraulic wheel brake to the hydraulic power source to control brake fluid flow into the reservoir from the first hydraulic wheel brake and to control brake fluid flow into the first hydraulic wheel brake from the hydraulic power source under the anti-lock control condition.

The hydraulic brake device also includes a second hydraulic wheel brake and a second pressure control device for effecting anti-lock control. The second pressure control device usually connects the second hydraulic wheel brake to the master cylinder. The second pressure control device connects the second hydraulic wheel brake to the hydraulic power source to control brake fluid flow into the reservoir from the second hydraulic wheel brake and to control brake fluid flow into the second hydraulic wheel brake from the hydraulic power source under the anti-lock control condition.

The first pressure control device comprises a first valve member connected to the first hydraulic wheel brake for switching the master cylinder to the hydraulic power source, a second valve member for permitting the flow of brake fluid into the first hydraulic wheel brake from the hydraulic power source and a third valve member for permitting brake fluid flow into the reservoir from the first hydraulic wheel brake.

The second pressure control device comprises a first valve member for permitting brake fluid flow into the second hydraulic wheel brake from the hydraulic power source and a second valve member for permitting brake fluid flow into the reservoir from the second hydraulic wheel brake.

Since the master cylinder is connected to the hydraulic wheel brake under normal braking conditions and the hydraulic power source is connected to hydraulic wheel brake under anti-lock brake conditions, the brake operation member of the vehicle can achieve a sufficient stroke under the normal braking condition, and the stroke of the brake operation member does not vary in spite of the reduction and increment of the brake pressure of the wheel brake under the anti-lock braking condition. Further, because two valve members (the first and second valve members) are operated to connect the hydraulic power source to the hydraulic wheel brake, the brake force is prevented from being applied to the hydraulic wheel brake by malfunction of one of the valve members when the brake operation member of the vehicle is not operated.

Because electric control technology which rapidly develops is applied to anti-lock control engineering, a quick reduction mode and a slow increasing mode are mainly used as means for adjustment of the brake. Since the valve member for permitting the flow of the brake fluid into the hydraulic wheel brake from the hydraulic power source is frequently switched to slowly increase the wheel brake, the valve member causes an operational noise. Further, a valve plunger and a valve seat which form the valve member are highly worn. Therefore, the valve plunger and the valve seat are made of an expensive and highly wearproof material.

A hydraulic brake device for a vehicle which applies the brake force to each of the four wheels when the brake operation member of the vehicle is not operated to promote a vehicle stability is disclosed in Japanese Patent Laid Open No. 4(1992)-193658.

The hydraulic brake device for a vehicle disclosed in the aforementioned Japanese Patent Laid Open No. 64(1989)-47644 cannot supply brake pressure to the front hydraulic wheel brakes when the brake operation member is not operated. Three valve members which are each of the 2-port, 2-position type (2-2 type valve member) must be added to the hydraulic brake device to permit the supply of brake pressure to the front hydraulic wheel brakes when the brake operation member is not operated and to prevent the brake pressure from being applied to the hydraulic wheel brakes by malfunction of the valve members when the brake operation member of the vehicle is not operated. Therefore, two 3-port, 3-position type valve members (3-3-type valve members), a 3-port, 2-position type valve member (3-2 type valve member) and three 2-2 type valve members must be used in a front hydraulic brake circuit of the prior art. Although each 3-3 type valve member can be replaced by a 2-2 type valve member (normally open type) and a 2-2 type valve member (normally close type), the front hydraulic brake circuit then requires a 3-2 type valve member and seven 2-2 type valve members. This causes the system to become quite expensive.

SUMMARY OF THE PRESENT INVENTION

In view of the foregoing, it would be desirable to provide a hydraulic brake device for a vehicle which can reduce the valve operational noise.

A need also exists for a hydraulic brake device for a vehicle which can apply a brake pressure to each of the four wheels independently even though a brake operation member is not operated.

It would also be desirable to provide a hydraulic brake device for a vehicle which is small in size and light in weight.

It would be further advantageous to provide a hydraulic brake device for a vehicle which can be easily manufactured.

A further need exists to provide a hydraulic brake device for a vehicle which is durable.

It would also be highly advantageous to provide a hydraulic brake device for a vehicle which is simple in structure and low in cost.

To address the foregoing, a hydraulic brake device for a vehicle in accordance with this invention comprises a reservoir for storing brake fluid, a master cylinder connected to the reservoir for generating brake pressure corresponding to an operation force of a brake operation member of the vehicle, a hydraulic power source connected to the reservoir for generating brake pressure corresponding to an operation force of a brake operation member of the vehicle, a hydraulic wheel brake, and a pressure control unit which connects the hydraulic wheel brake to the master cylinder and connects the hydraulic wheel brake to the hydraulic power source to control brake fluid flow into the reservoir from the hydraulic wheel brake and brake fluid flow into the hydraulic wheel brake from the hydraulic power source under an anti-lock condition. The pressure control unit further includes a first valve device for disconnecting the hydraulic wheel brake from the master cylinder and connecting the hydraulic wheel brake to the reservoir, a second valve device for disconnecting the first valve device from the hydraulic wheel brake, a third valve device for connecting the hydraulic wheel brake to the hydraulic power source to bypass the first and second valve devices, and an orifice for restricting the quantity of brake fluid which flows into the hydraulic wheel brake from the hydraulic power source in order that the quantity of brake fluid is smaller than that of the brake fluid which flows into the reservoir from the hydraulic wheel brake through the first and second valve devices.

In accordance with another aspect of the invention, a hydraulic brake device for a vehicle includes a reservoir for storing brake fluid, a hydraulic power source connected to the reservoir for providing hydraulic brake pressure responsive to an operating force of an operation member of the vehicle, a wheel brake for being mounted on a wheel of a vehicle to apply a braking force to the wheel, and a pressure control unit connecting the hydraulic pressure source to the wheel brake to supply hydraulic brake pressure to the wheel brake under an anti-lock condition and connecting the wheel brake to the reservoir to discharge brake fluid from the wheel brake to the reservoir under the anti-lock condition. The pressure control unit includes an orifice for allowing a restricted flow of brake fluid from the hydraulic pressure source to the wheel brake while fluid is being discharged to the reservoir, with the brake fluid flowing through the orifice being of a quantity that is less than the quantity of brake fluid being discharged from the wheel brake to the reservoir.

In accordance with a further aspect of the invention, a hydraulic brake device for a vehicle includes a reservoir for storing brake fluid, a hydraulic pump for pumping out brake fluid from the reservoir to generate hydraulic brake pressure, a regulator valve for regulating the hydraulic brake pressure in response to an operation force of a brake operation member of a vehicle, a front left wheel brake for being mounted on a front left wheel of the vehicle, a front right wheel brake for being mounted on a front right wheel of the vehicle, and an actuator for increasing the brake pressure in the front left wheel brake and the front right wheel brake by supplying brake fluid from either the regulator valve or the hydraulic pump to the front left wheel brake and the front right wheel brake and for decreasing the brake pressure in the front left wheel brake and the front fight wheel brake by discharging brake fluid from the front left wheel brake and the front right wheel brake to the reservoir. The actuator includes a first orifice for allowing a restricted flow of brake fluid from the regulator valve to the front left wheel brake while brake fluid is being discharged from the front left wheel brake to the reservoir, a second orifice for allowing a restricted flow of brake fluid from the regulator valve to the front right wheel brake while brake fluid is being discharged from the front right wheel brake to the reservoir, a first valve for disconnecting the first orifice from the regulator valve and connecting the first orifice to the hydraulic pump, and a second valve for disconnecting the second orifice from the regulator valve and connecting the second orifice to the hydraulic pump.

BRIEF DESCRIPTION OF THE DRAWING FLUIDS

The features and advantages of the hydraulic brake device for a vehicle according to the present invention, and others, will be more clearly appreciated from the following description considered in conjunction with the accompanying drawing figures in which like elements bear like reference numerals and wherein.

DETAILED DESCRIPTION OF PREFERRED EMBODIMENTS OF THE INVENTION

Figure 1:
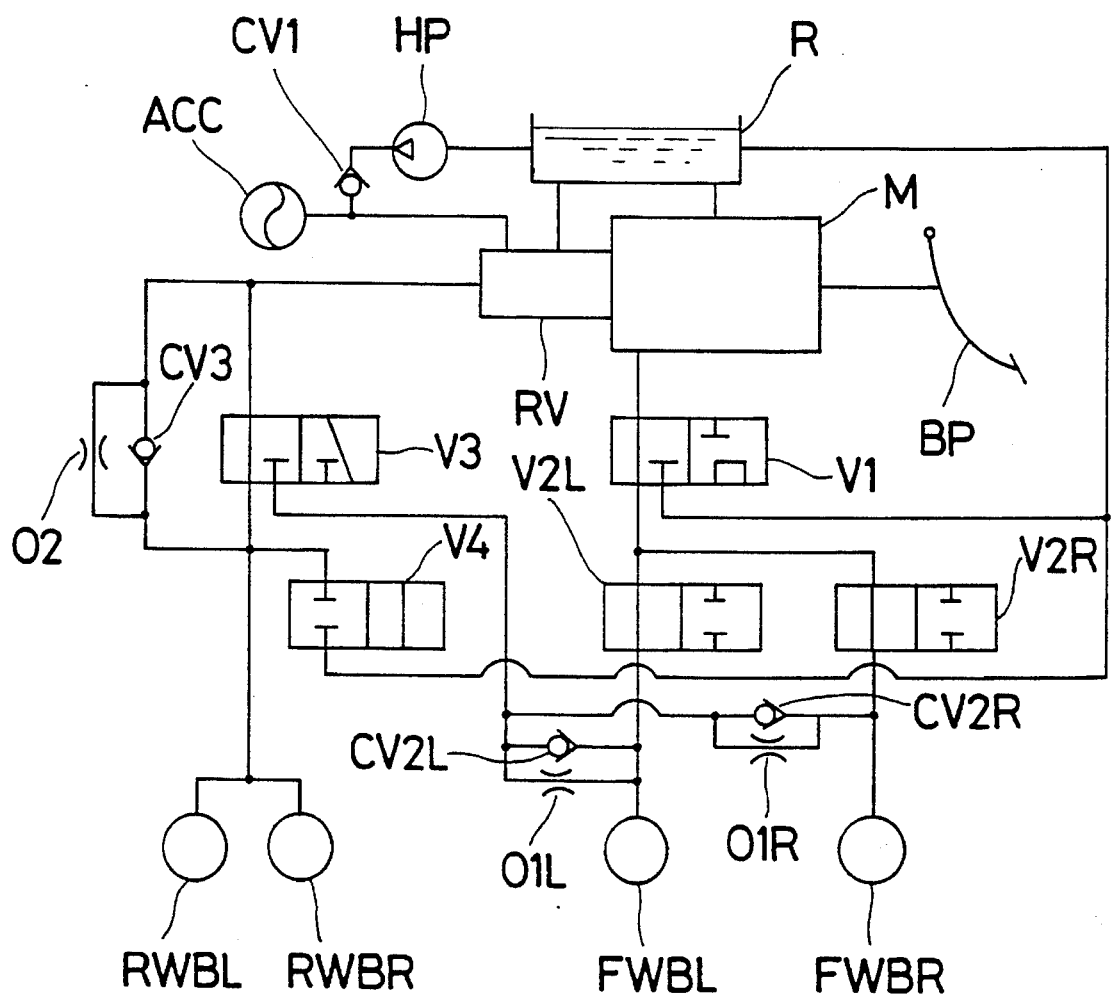
FIG. 1 is a circuit diagram of a hydraulic brake device for a vehicle according to a first embodiment of the present invention.

A first embodiment of the hydraulic brake device for a vehicle of the present invention is shown in FIG. 1. As seen in FIG. 1, a master cylinder M is connected to a reservoir R which stores brake fluid and supplies brake fluid to the master cylinder. The master cylinder M is connected to a brake pedal BP, which functions as a brake operation member of the vehicle, in order to generate brake pressure in proportion to the depressing force applied to the brake pedal BP as a brake operation force. A hydraulic pump HP is connected to the reservoir R and is driven by an electric motor (not shown) to pump out the brake fluid in the reservoir R to an accumulator ACC through a check valve CVI. A regulator valve RV is connected to the accumulator ACC and the reservoir R. The regulator valve RV is supplied with the brake pressure generated by the master cylinder M to discharge power pressure in proportion to the brake pressure generated by the master cylinder M. A power pressure source is formed by the hydraulic pump HP, the check valve CVI, the accumulator ACC and the regulator valve RV.

Figure 2:
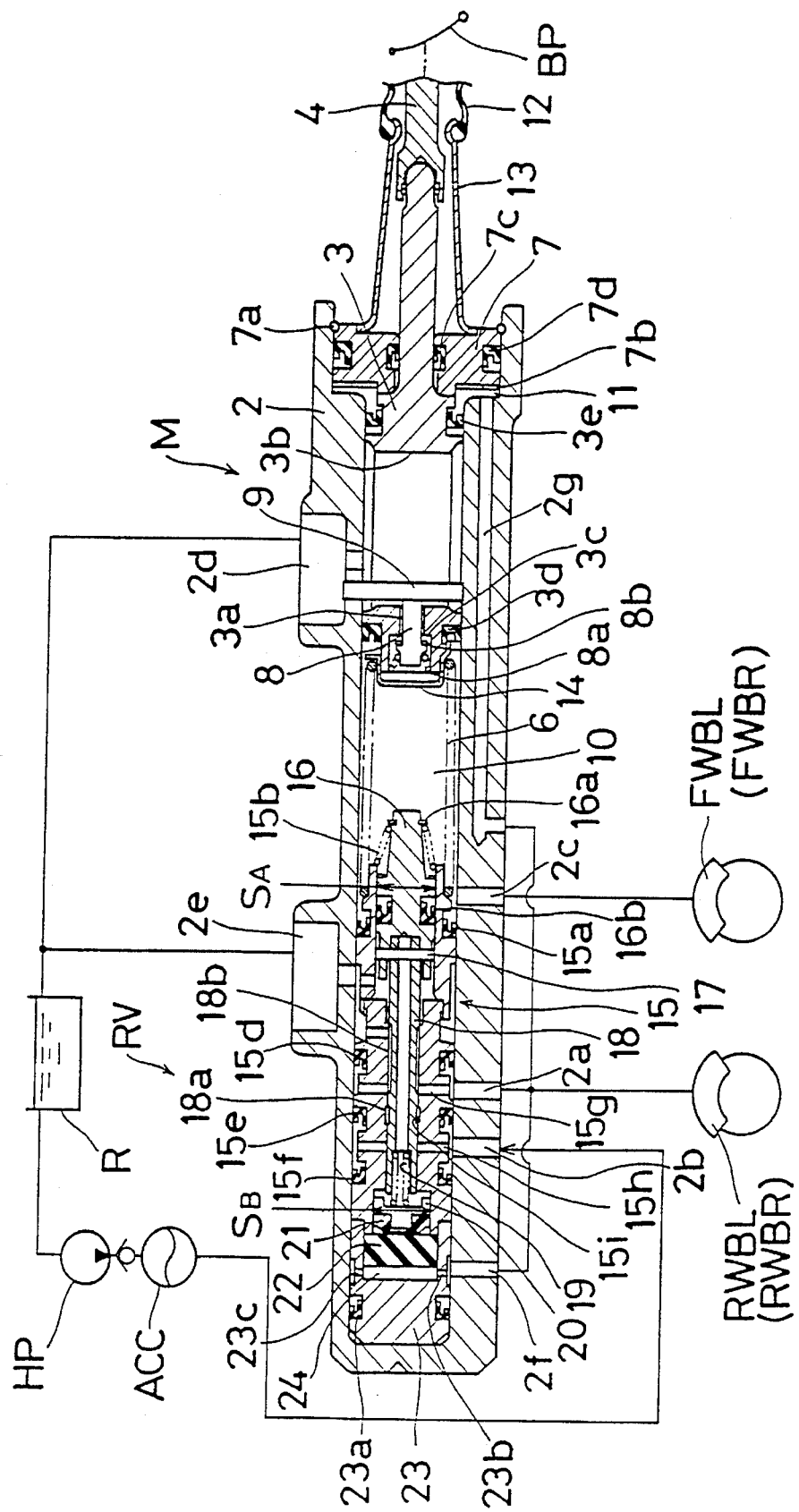
FIG. 2 is a cross-sectional view of a master cylinder and a regulator valve of the hydraulic brake device of the present invention.

The master cylinder M and the regulator valve RV are illustrated in more detail in FIG. 2. A first piston 3 is slidably disposed in a cylinder body 2 and is connected to the brake pedal BP through a push rod 4. The first piston 3 is biassed by a return spring 6 to be in contact with a plate member 7 which is prevented from moving in the rightward direction by a snap ring 7a. A stopper 7b is disposed at the left side of the plate member 7 as shown in FIG. 2 for limiting leftward movement of the plate member 7.

The first piston 3 includes a connecting passage 3a into which an inlet valve 8 is inserted. The inlet valve 8 is biassed by a spring 8a and is in contact with a pin 9. The pin 9 is fixed to the cylinder body 2 and is inserted into a through hole 3b of the first piston 3. Under the condition shown in FIG. 2, a valve portion 8b of the inlet valve 8 is not in contact with a valve seat 3c provided on the first piston 3.

Seal cups 3d, 3e are mounted on the respective left and right portions of the first piston 3. The plate member 7 includes an inner seal cup 7c and an outer seal cup 7d. With the above seal cups 3d, 3e, 7c and 7d, a pressure chamber 10 is formed at the left side of the first piston 3 and an auxiliary pressure chamber 11 is formed between the right side of first piston 3 and the plate member 7.

A boot 12 is provided to separate the inside of the brake pressure generating device for a vehicle 1 from the outside thereof. A retainer 13 is connected to the boot 12 to support the boot 12 and to prevent the push rod 4 from becoming radially inclined. Further, a cup retainer 14 is engaged with the first piston 3 to connect or operationally associate the return spring 6 and the first piston 3, and to prevent the cup seal 3d from being disengaged from the first piston 3.

A sleeve member 15 is forced by the return spring 6 to be in contact with a left end portion of the cylinder body 2. The sleeve member 15 includes a seal cup 15a which forms the pressure chamber 10 with the first piston 3. A second piston 16 is slidably disposed in the sleeve member 15. The second piston 16 is biassed in the rightward direction relative to the sleeve member 15 to be in contact with a stopper 15c by a piston spring 15b which is engaged with a snap ring 16a.

The second piston 16 includes a seal cup 16b for forming the pressure chamber 10 and for receiving the pressure in the pressure chamber 10 to thereby move in the leftward direction shown in FIG. 2. The second piston 16 is connected to a spool valve 18 through a pin 17 in order that the spool valve 18 can be moved integrally with the second piston 16.

A piston return member 20 is connected to a left end of the spool valve 18 through a spring 19. A reaction member 21 which is formed with a trapezoidal shaped configuration is mounted on the piston return member 20 to form a restriction means. The reaction member 21 is biassed by the spring 19 to contact an elastic member 22 (made of rubber or the like) which forms the restriction means. A retainer 23 is fixed to the sleeve member 15 to prevent the sleeve member 15 from moving. The retainer 23 includes a seal cup 23a and passages 23b, 23c. The elastic member 22 forms a regulated pressure chamber 24 with the retainer 23.

The sleeve member 15 further includes seal cups 15d, 15e and 15f which are arranged from the right to the left as seen in FIG. 2. An outlet port 15g is disposed between the seal cups 15d, 15e for being connected to a rear wheel brake RWBL (RWBR) of the vehicle. Further, an inlet port 15h is disposed between the seal cups 15e, 15f into which a brake fluid charged in the accumulator ACC is introduced. The brake fluid in the reservoir R is pressurized by the hydraulic pump HP in order to charge into the accumulator ACC. The outlet port 15g and the inlet port 15h are respectively connected to an outlet port 2a and an inlet port 2b disposed on the cylinder body 2. The cylinder body 2 includes an outlet port 2c connected to a front wheel brake FWBL (FWBR). Further, the cylinder body 2 includes inlet ports 2d, 2e both of which are connected to the reservoir R.

The spool valve 18 includes a first groove 18a and a second groove 18b. The sleeve member 15 also includes a groove 15i. The outlet port 2a is connected to a port 2f which is connected to the regulated pressure chamber 24. The outlet port 2a is further connected to the auxiliary pressure chamber 11 through a passage 2g.

The operation of the brake pressure generating device 1 for a vehicle will be described hereinafter. When the brake pedal BP is operated, the first piston 3 is moved in the leftward direction shown in FIG. 2 through the push rod 4. Therefore, since the inlet valve 8 is separated from the pin 9, the valve portion 8b is contacted with the valve seat 3c by the elastic force of the spring 8a so as to separate the pressure chamber 10 from the reservoir R.

Later, the brake pressure PM is generated in the pressure chamber 10 because of a decrease in capacity of the pressure chamber 10 according to a stroke of the piston 3. At this time, the second piston 16 receives a force PM×SA (SA: cross-sectional area of the second piston 16) and is moved in the leftward direction shown in FIG. 2 since the second piston 16 receives the brake pressure PM in the pressure chamber 10.

The spool valve 18 is moved integrally with the second piston 16 in the leftward direction because the spool valve 18 is fixed to the second piston 16 through the pin 17. Therefore, the spool valve 18 compresses the spring 19 and contacts the piston return member 20. The first groove 18a of the spool member 18 is connected to the inlet port 15h of the sleeve member 15 by movement of the spool valve 18 in order to connect the inlet port 15h and the groove 15i of the sleeve member 15 through the first groove 18a. On the other hand, the second groove 18b is connected to the groove 15i to connect the groove 15i and the outlet port 15g through the second groove 18b. Therefore, the inlet port 15h is connected to the outlet port 15g by the movement of the spool valve 18. Consequently, the brake pressure in the accumulator ACC is slowly introduced into the regulated pressure chamber 24 from the outlet port 2a through the port 2f because the inlet port 2b is connected to the outlet port 2a through the inlet port 15h, the first groove 18a, the groove 15i, the second groove 18b and the outlet port 15g.

The pressure in the regulated pressure chamber 24 forces the elastic member 22 to move the spool valve 18 in the rightward direction through the reaction member 21 and the piston return member 20 against the brake pressure PM in the pressure chamber 10. The spool valve 18 is balanced when the pressure forces which the spool valve 18 receives from the pressure chamber 10 and the regulated pressure chamber 24 are equal.

At this time, with the area of the elastic member 22 in contact with the reaction member 21 represented by SV, the relationship between the pressure PM in the pressure chamber 10 and a regulated pressure PR introduced into the regulated pressure chamber 24 from the accumulator 26 through the spool valve 18 is represented by the following formula (losses associated with the load of the return spring 6 or the like are omitted.).

$$PM \times SA = PR \times SV$$

Therefore, the regulated pressure PR introduced into the regulated pressure chamber 24 is shown as follows.

$$PR = PM \times SA/SV$$

When the regulated pressure PR in the regulated pressure chamber 24 is not very large, the area SV of the elastic member 22 in contact with the reaction member 21 is not so large because the elastic member 22 is not strongly forced toward the reaction member 21. However, the area SV of the elastic member 22 becomes larger according to the increase of the regulated pressure PR until the area PV becomes a maximum value SB. Therefore, the characteristic of the relationship between the brake pressure PM in the pressure chamber 10 and the regulated pressure PR in the regulated pressure chamber 24 is represented by a calm curve X shown in FIG. 2. The characteristic can be varied by altering the consistency of the elastic member 22 or the shape of the portion of the reaction member 21 contacted with the elastic member 22.

When the area of the reaction member 21 is contacting with the elastic member 22 becomes SB, the regulated pressure PR is represented by the following formula.

$$PR = PM \times SA/SB$$

Figure 3:
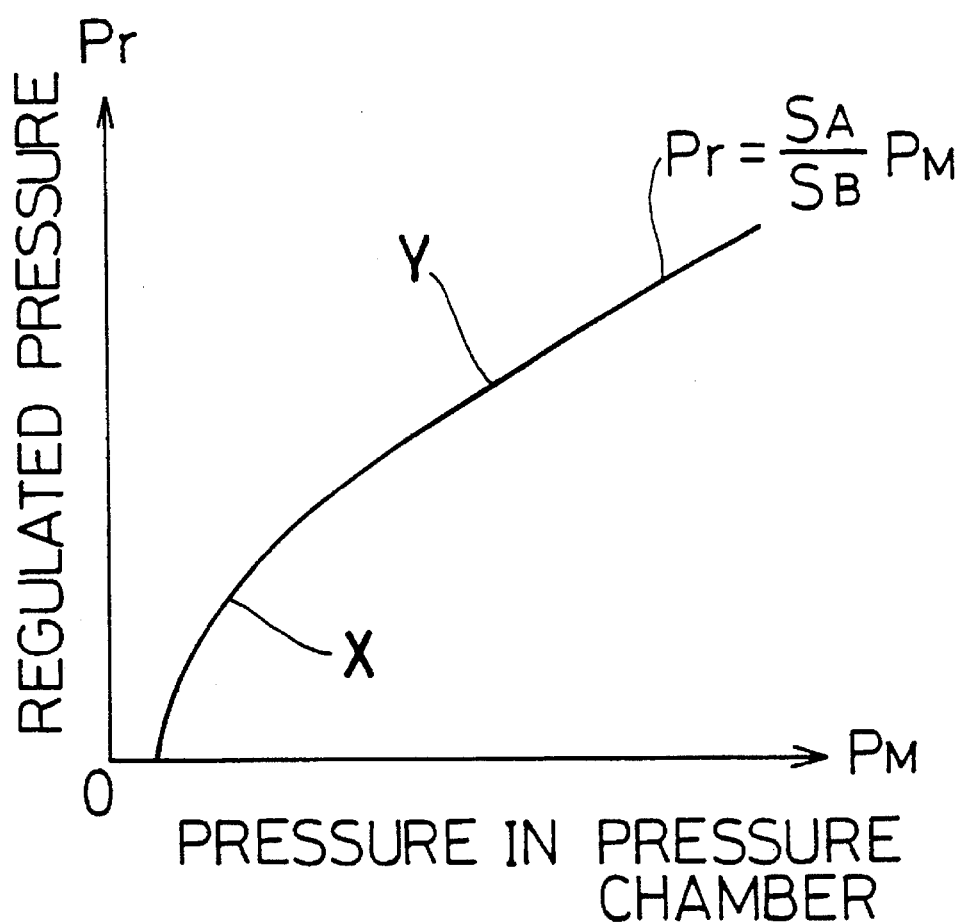
FIG. 3 is a diagram showing characteristics between the pressure in a pressure chamber of the master cylinder and the regulated pressure regulator by the regulate valve.

From then on, the regulated pressure PR increases linearly according to the increase of the brake pressure PM in the pressure chamber 10 because the values SA, SB are constant (see Y in FIG. 3). The characteristic of the relationship between the regulated pressure PR and the brake pressure PM (shown by an inclination of a line Y of FIG. 3) is varied by variations of the sectional areas SA, SB of the second piston 16 and the reaction member 21. Therefore, the characteristic of the brake pressure PM in the pressure chamber 10 relative to a brake pedal operating force can be varied.

The regulated pressure PR introduced into the regulated pressure chamber 24 from the accumulator ACC through the spool valve 18 is transmitted to the rear wheel brake RWBL (RWBR) and to the auxiliary pressure chamber 11 through the passage 2g so as to boost up the operation of the first piston 3. The brake pressure PM in the pressure chamber 10 is supplied to the front wheel brake FWBL (FWBR).

The brake fluid usually flows into the front left wheel brake FWBL from the pressure chamber 10 of the master cylinder M through a 3-port, 2-position first valve V1 (3-2 type valve) and a second valve V2L (normally open type) each of which is operated by an electromagnetic solenoid.

On the contrary, the brake fluid returns to the pressure chamber 10 of the master cylinder M from the front left wheel brake FWBL through the second valve V2L and the first valve V1.

Further, the brake fluid flows into the front right wheel brake FWBR from the pressure chamber 10 of the master cylinder M through the first valve V1 and a second valve V2R (normally open type) which is operated by an electromagnetic solenoid. On the contrary, the brake fluid returns to the pressure chamber 10 of the master cylinder M from the front right wheel brake FWBR through the second valve V2R and the first valve V 1. The first valve V 1 disconnects the front wheel brakes FWBL, FWBR from the reservoir R to connect the front wheel brakes FWBL, FWBR to the master cylinder M when the first valve V1 is not operated. However, the first valve V1 disconnects the front wheel brakes FWBL, FWBR from the master cylinder M to connect the front wheel brakes FWBL, FWBR to the reservoir R when the first valve V1 is operated.

A 3-2 type third valve V3 (which is operated by an electromagnetic solenoid) and first orifices O1L, O1R are disposed in a brake circuit shown in FIG. 1 in order that the brake fluid slowly flows into the front wheel brakes FWBL, FWBR from the regulator valve RV when the first valve V1 is operated.

When the third valve V3 is operated, the front left wheel brake FWBL is connected to the regulator valve RV through the first orifice O1L and the third valve V3 so that brake fluid is able to slowly flow into the front left wheel brake FWBL from the regulator valve RV through the third valve V3 and the first orifice O1L. At the same time, the front right wheel brake FWBR is connected to the regulator valve RV through the first orifice O1R and the third valve V3 so that brake fluid is able to slowly flow into the front right wheel brake FWBR from the regulator valve RV through the third valve V3 and the first orifice O1R (Anti-lock control).

Each of the first orifices O1L, O1R restricts the quantity of brake fluid which flows into each of the front wheel brakes FWBL, FWBR from the regulator valve RV through the third valve V3 in order that the quantity of brake fluid is smaller than that of the brake fluid which flows into the reservoir R from each of the front wheel brakes FWBL, FWBR through each of the second valves V2L, V2R and the first valve VI. Further, each of the first orifices OIL, O1R can adjust the quantity of the brake fluid which flows into each of the front wheel brakes FWBL, FWBR from the regulator valve RV through the third valve V3.

Therefore, when the second valves V2L, V2R are operated, the brake pressures in the front wheel brakes FWBL, FWBR are maintained. When the first valve VI is operated and the second valves V2L, V2R are not operated, the brake pressures in the front wheel brakes FWBL, FWBR are rapidly reduced. When the third valve V3 and the second valves V2L, V2R are operated, the brake pressure generated by the regulator valve RV is slowly transmitted to the front wheel brakes FWBL, FWBR through each of the first orifices O1L, O1R so as to calmly increase the brake pressures in the front wheel brakes FWBL, FWBR. When the first valve V1 and the third valve V3 are operated and the second valves V2L, V2R are not operated, the brake pressures in the front wheel brakes FWBL, FWBR are reduced.

Each of check valves CV2L, CV2R is provided in the brake circuit to be in parallel with each of the first orifices O1L, O1R. Therefore, the brake fluid quickly returns to the regulator valve RV from the front wheel brakes FWBL, FWBR in response to release of the brake pedal BP when the second and third valves V2L, V2R and V3 are operated.

The third valve V3 connects the rear wheel brakes RWBL, RWBR with the regulator valve RV when the third valve V3 is not operated. Therefore, the brake fluid flows into the rear wheel brakes RWBL, RWBR from the regulator valve RV through the third valve V3 and returns to the regulator valve RV from the rear wheel brakes RWBL, RWBR through the third valve V3.

A normally closed 2-2 type fourth valve V4 (which is operated by an electromagnetic solenoid) is disposed in the brake circuit so that the brake fluid flows into the reservoir R from the rear wheel brakes RWBL, RWBR when the third valve V3 is operated. Further, a second orifice 02 is disposed in the brake circuit to be in parallel with the third vane V3. Therefore, the brake fluid slowly flows into the rear wheel brakes RWBL, RWBR from the regulator valve RV through the second orifice 02 when the third valve V3 is operated. A check valve CV3 is provided in the brake circuit to be in parallel with the second orifice 02. Therefore, the brake fluid quickly returns to the regulator valve RV from the rear wheel brakes RWBL, RWBR in response to the release of the brake pedal BP when the third valve V3 is operated.

When the third valve V3 is operated, the brake pressure generated by the regulator vane RV is slowly transmitted to the rear wheel brakes RWBL, RWBR through the second orifice 02 to calmly increase the brake pressures in the rear wheel brakes RWBL, RWBR. When the third valve V3 and the fourth valve V4 are operated, the brake pressures in the rear wheel brakes RWBL, RWBR are reduced.

A first pressure control device for effecting anti-lock control is formed by the first valve V1, the second valves V2L, V2R, the third valve V3, the first orifices O1L, O1R and the check vanes CV2L, CV2R. A second pressure control device for effecting anti-lock control is formed by the third valve V3, the fourth valve V4, the second orifice 02 and the check valve CV3.

The first valve V1, the second valves V2L, V2R, the third valve V3 and the fourth valve V4 are operated by an electric control device (not shown). When the brake pedal BP is operated, the electric control device operates the valves V1, V2L, V2R and V3 to control the pressures in the front wheel brakes FWBL, FWBR based on wheel speed signals output from front wheel speed sensors (not shown) which are mounted on the front wheels. Further, the electric control device operates the valves V3 and V4 to control the pressures of the rear wheel brakes RWBL, RWBR based on wheel speed signals output from rear wheel speed sensors (not shown) which are mounted on the rear wheels. In accordance with the above operations, the front and rear wheels are prevented from being locked.

Figure 4:
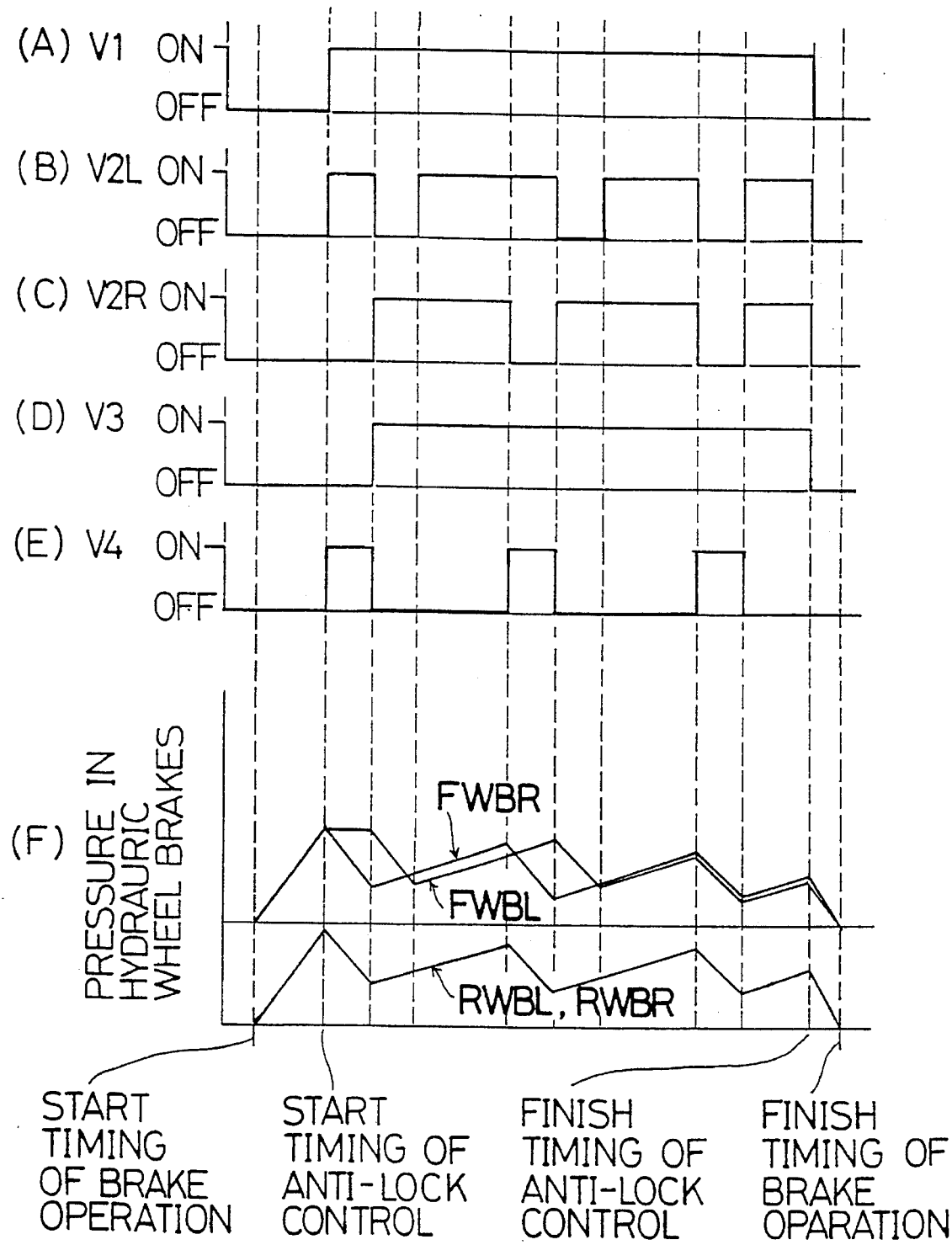
FIG. 4 is a time chart showing the operation of the hydraulic brake device according to the first embodiment of the present invention.

The brake pressures of the wheel brakes FWBL, FWBR, RWBL and RWBR vary in response to the operations of the valves V1, V2R, V2L, V3 and V4 as shown in FIG. 4.

Figure 5:
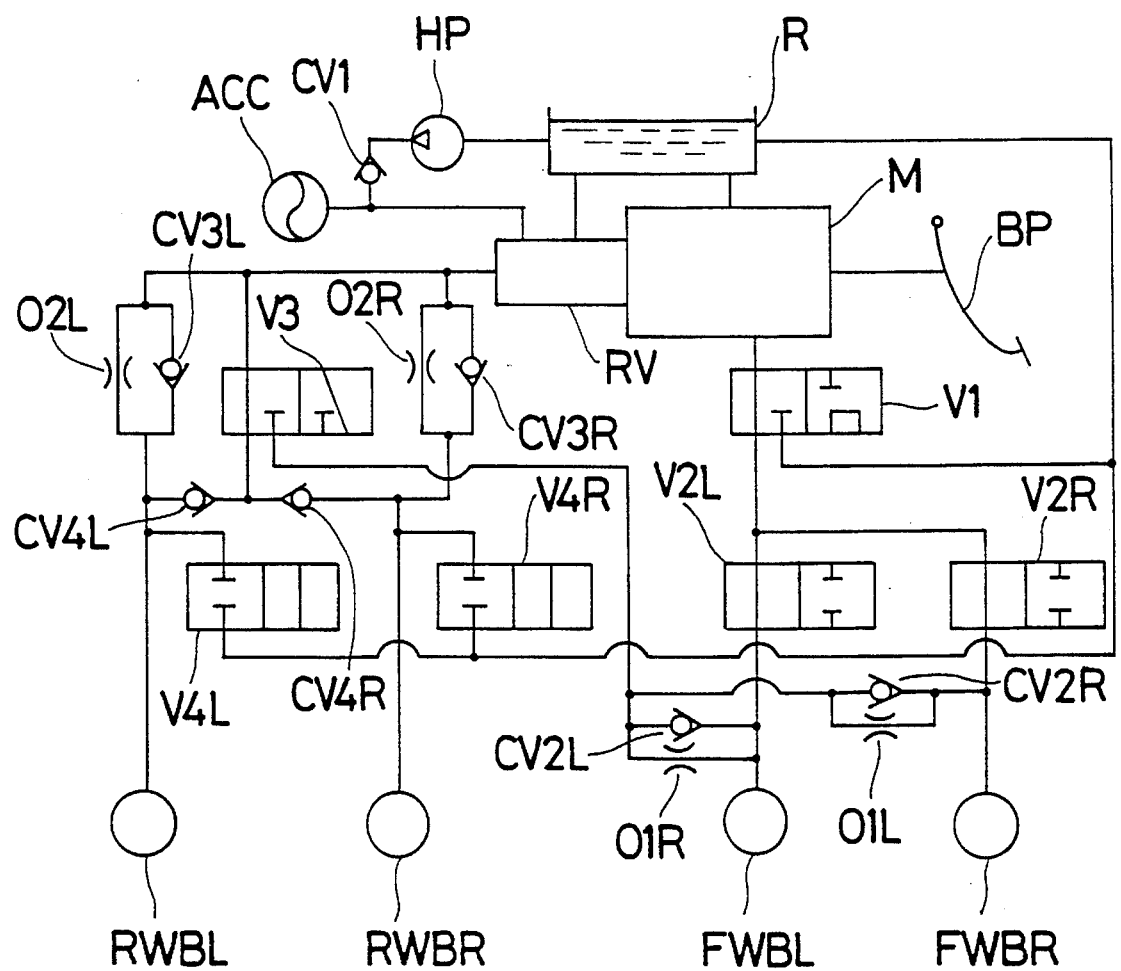
FIG. 5 is a circuit diagram of a hydraulic brake device according to a second embodiment of the present invention.

A second embodiment of the hydraulic brake device for a vehicle of the invention is shown in FIG. 5. The hydraulic brake device shown in FIG. 5 differs from the embodiment depicted in FIG. 1 in that the FIG. 5 device can independently control the brake pressures of the rear left wheel brake RWBL and the rear right wheel brake RWBR. The components which are commonly used in the first and second embodiments have the same reference numerals and the descriptions of the components which are commonly used in the first and second embodiments are not repeated.

In accordance with FIG. 5, fourth valves V4L, V4R, second orifices 02L, 02R and check valves CV3L, CV3R are disposed in a rear brake circuit including the rear wheel brakes RWBL, RWBR respectively. Further, check valves CV4L, CV4R prevent brake fluid from returning to the third valve V3 from the rear wheel brakes RWBL, RWBR.

A second pressure control device for effecting anti-lock control is formed by the third valve V3, the fourth valves V4L, V4R, the second orifices 02L, 02R and the check valves CV3L, CV3R.

Figure 6:
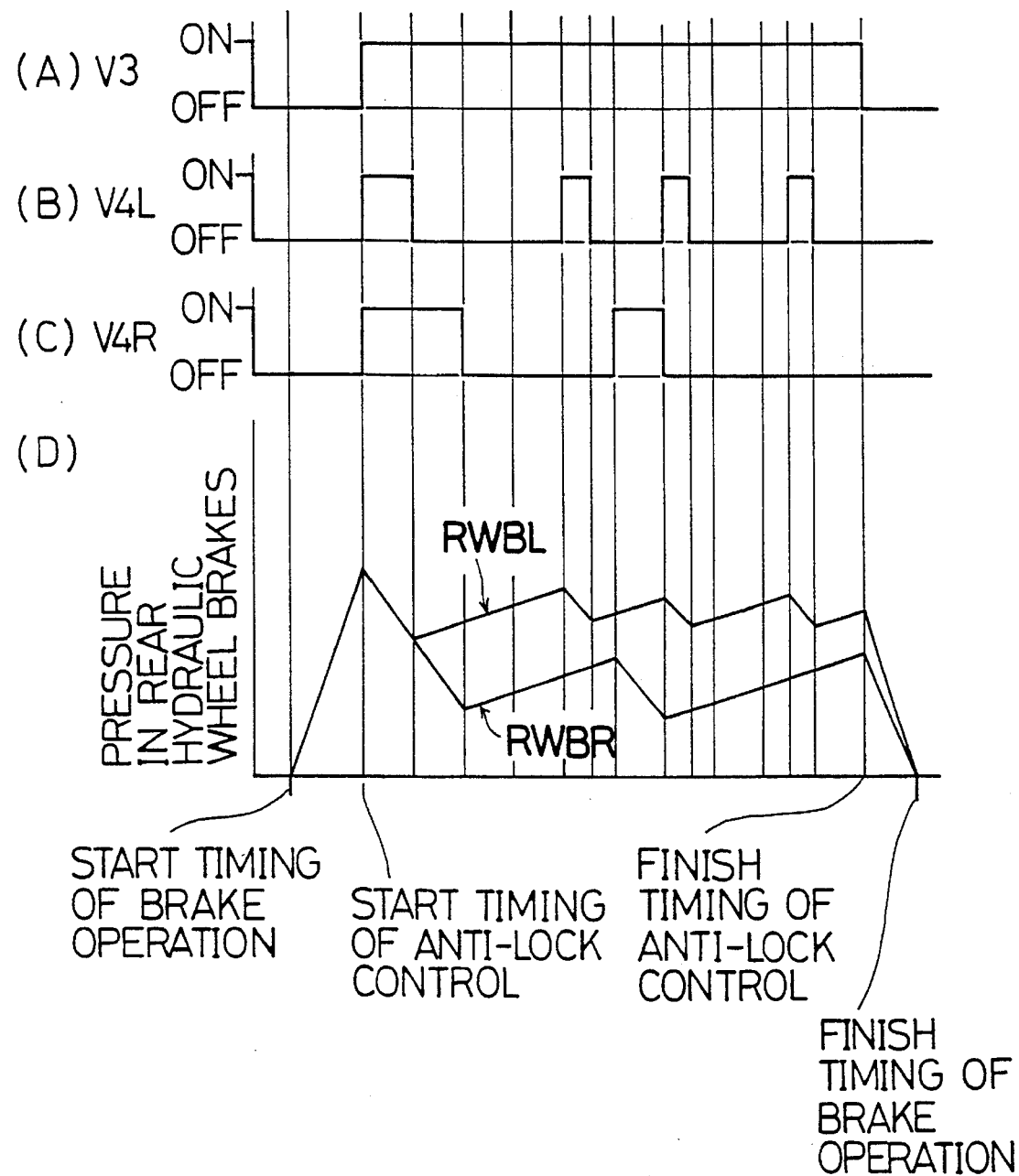
FIG. 6 is a time chart showing the operation of the hydraulic brake device according to the second embodiment of the present invention.

The brake pressures of the rear wheel brakes RWBL, RWBR vary in response to the operations of the valves V3, V4L and V4R as shown in FIG. 6.

Figure 7:
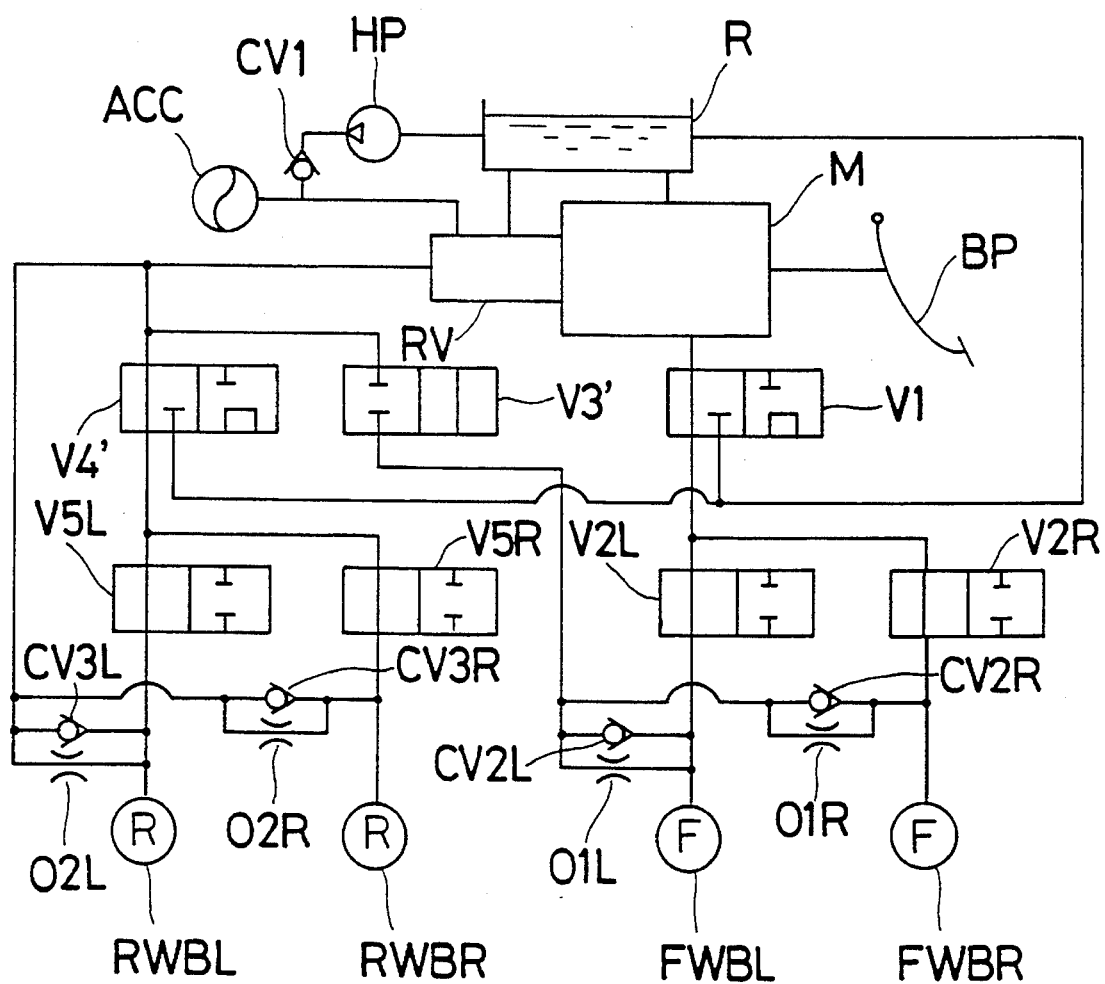
FIG. 7 is a circuit diagram of a hydraulic brake device according to a third embodiment of the present invention.

A third embodiment of the hydraulic brake device for a vehicle of the invention is shown in FIG. 7. As in the case of the second embodiment shown in FIG. 5, the hydraulic brake device depicted in FIG. 7 can independently control the brake pressures of each of the rear left wheel brake RWBL and the rear right wheel brake RWBR. The hydraulic brake device for a vehicle of the third embodiment comprises a normally closed 2-2 type valve V3' (which is operated by an electromagnetic solenoid). Further, the second pressure control device for effecting anti-lock control is formed with a 3-2 type fourth valve V4', two 2-2 type fifth valves V5L, V5R (each of which is operated by an electromagnetic solenoid), two second orifices 02L, 02R and two check valves CV3L, CV3R. The third embodiment of the hydraulic brake device includes one more vane than that of the second embodiment. However, each of the brake pressures of the wheel brakes FWBL, FWBR, RWBL and RWBR can be independently controlled because the operations of the first and second pressure control devices for effecting anti-lock control do not interfere at all with each other.

In accordance with the above embodiments, the regulated pressure is supplied to the rear wheel brakes RWBL, RWBR. However, a master cylinder including two pressure chambers which are each connected to the front wheel brakes FWBL, FWBR and rear wheel brakes RWBL, RWBR and a hydraulic brake booster may be applied to the hydraulic brake device of the invention as shown in the aforementioned Japanese Patent Laid Open No. 64-47644.

Figure 8:
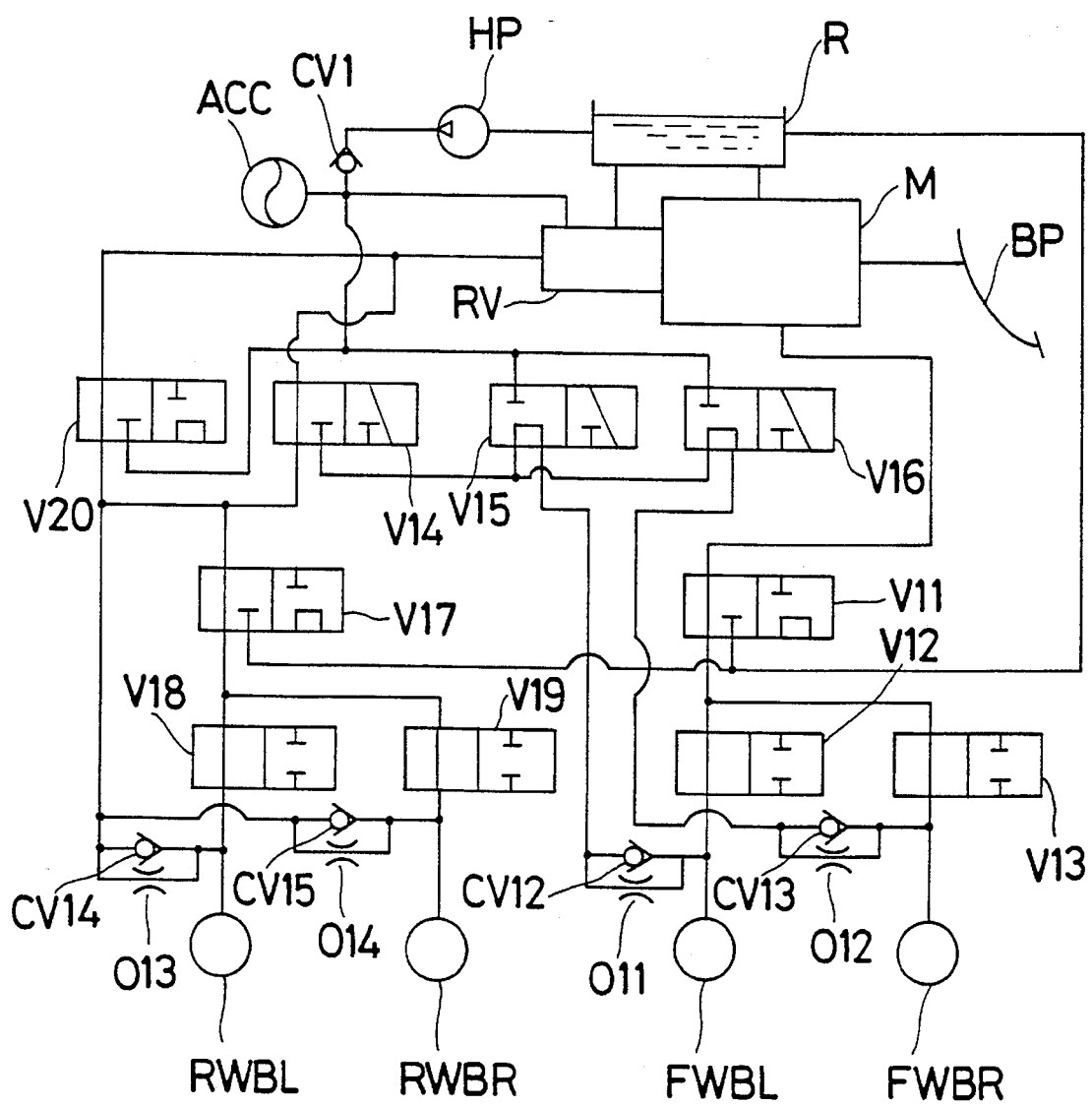
FIG. 8 is a circuit diagram of a hydraulic brake device according to a fourth embodiment of the present invention.

A fourth embodiment of the hydraulic brake device of the invention is shown in FIG. 8. The brake fluid usually flows into the front left wheel brake FWBL from the pressure chamber 10 of the master cylinder M through a 3-2 type valve V11 and a normally open type valve V12 each of which is operated by an electromagnetic solenoid. At the same time, the brake fluid flows into the front right wheel brake FWBR from the pressure chamber 10 of the master cylinder M through the valve V11 and a normally open type valve V13 which is operated by an electromagnetic solenoid.

The valve V11 disconnects the valves V12, V13 from the reservoir R to connect the valves V12, V13 to the master cylinder M when the valve V11 is not operated. On the other hand, the valve V11 disconnects the valves V12, V13 from the master cylinder M and connects the valves V12, V13 to the reservoir R when the valve V11 is operated.

When the valve V11 and a valve V14 are operated, the front wheel brakes FWBL, FWBR are connected to the regulator valve RV through the orifice 011, the orifice 012 and the valve V14 so that the brake fluid slowly flows into the front wheel brakes FWBL, FWBR from the regulator valve RV.

Check valves CV12, CV13 are provided in the brake circuit in parallel arrangement with each of the orifices 011, 012. Therefore, the brake fluid quickly returns to the regulator valve RV from the front wheel brakes FWBL, FWBR in response to release of the brake pedal BP when the valves V12, V13 and V14 are operated.

Two 3-2 type valves V15, V16 (which are operated by electromagnetic solenoids) are also provided in the fourth embodiment to independently control the brake pressures of the front wheel brakes FWBL, FWBR when the valves V15, V16 are not operated. The front left wheel brake FWBL is connected to the accumulator ACC through the orifice O11 and the valve V15 when the valve V15 is operated. Further, the front right wheel brake FWBR is connected to the accumulator ACC through the orifice O12 and the valve V16 when the valve V16 is operated.

In accordance with the embodiment shown in FIG. 8, the brake pressure generated by the regulator valve RV is transmitted to the rear left wheel brake RWBL through the valve V14, a 3-2 type valve V17 and a normally open 2-2 type valve V18, each of which is operated by an electromagnetic solenoid. At the same time, the brake pressure of the regulator valve RV is transmitted to the rear right wheel brake RWBR through the valve V14, the valve V17 and a normally open 2-2 type valve V19 which is operated by an electromagnetic solenoid. The valve V17 disconnects the rear wheel brakes RWBL, RWBR from the regulator valve RV and connects the rear wheel brakes RWBL, RWBR to the reservoir R. The valve V18 and the valve V19 disconnect each of the rear wheel brakes RWBL, RWBR from the valve V17.

The rear left wheel brake RWBL is connected to the regulator valve RV through an orifice O13, the valve V14 and a 3-2 type valve V20 in order that the brake fluid slowly flows into the rear left wheel brake RWBL through the orifice O13 when the valve V18 is operated. At the same time, the rear right wheel brake RWBR is connected to the regulator valve RV through an orifice O14, the valve V14 and the valve V20 in order that the brake fluid slowly flows into the rear right wheel brake RWBR through the orifice O14 when the valve V19 is operated.

The valve V14 and the valve V20 are disposed in parallel arrangement to each other. When the valve V14 and the valve V20 are operated, the valve V17 and the orifices O13, O14 are disconnected from the regulator valve RV and connected to the accumulator ACC so that brake pressure is transmitted to the rear wheel brakes RWBL, RWBR from the accumulator ACC through the valves V17, V18 and V19 or the orifices O13, O14.

Check valves CV14, CV15 are provided in the brake circuit in parallel arrangement with each of the first orifices O13, O14. Therefore, the brake fluid quickly returns to the regulator valve RV from the rear wheel brakes RWBL, RWBR in response to the release of the brake pedal BP when the valves V17, V18 and V19 are operated.

The valves V11 to V20 are operated by an electric control device (not shown). When the brake pedal BP is operated, the electric control device operates the valves V11, V12, V13 and V14 to control the pressures of the front wheel brakes FWBL, FWBR based on wheel speed signals output from front wheel speed sensors (not shown) which are each mounted on respective front wheels. Further, the electric control device operates the valves V17, V18 and V19 to control the pressures of the rear wheel brakes RWBL, RWBR based on wheel speed signals output from rear wheel speed sensors (not shown) which are each mounted on respective rear wheels (Anti-lock control). In accordance with the above operations, the front and rear wheels are prevented from being locked.

Further, when the brake pedal BP is not operated, the electric control device operates the valves V14, V17, V18, V19 and V20 to supply the pressures of the rear wheel brakes RWBL, RWBR based on the wheel speed signals output from the rear wheel speed sensors (Anti-slip control). In accordance with the above operations, the rear wheels are prevented from slipping when the vehicle starts.

Further, when the vehicle runs on a curve, the electric control device operates the valves V11, V12, V13, V15 and V16 to supply the pressures of the front wheel brakes FWBL, FWBR based on signals output from the wheel speed sensors, a front steering angle sensor, a longitudinal acceleration sensor and a lateral acceleration sensor or the like (Stability control). In accordance with the above operations, the stability of the vehicle can be achieved or promoted.

When the valve V12 and the valve V15 are operated under the stability control condition, the brake pressure in the accumulator ACC is transmitted to the front left wheel brake FWBL through the valve V15 and the orifice O11 to slowly increase the brake pressure in the front left wheel brake FWBL. When the valve V13 and the valve V16 are operated, the brake pressure in the accumulator ACC is transmitted to the front right wheel brake FWBR through the valve V16 and the orifice O12 to slowly increase the brake pressure in the front right wheel brake FWBR.

When the valve V15, the valve V16 and the valve V11 are operated and the valve V12 is not operated, the brake fluid in the front left wheel brake FWBL flows into the reservoir R to quickly reduce the brake pressure in the front left wheel brake FWBL. When the valve V15, the valve V16 and the valve V11 are operated and the valve V13 is not operated, the brake fluid in the front right wheel brake FWBR flows into the reservoir R to quickly reduce the brake pressure in the front right wheel brake FWBR.

Figure 9:
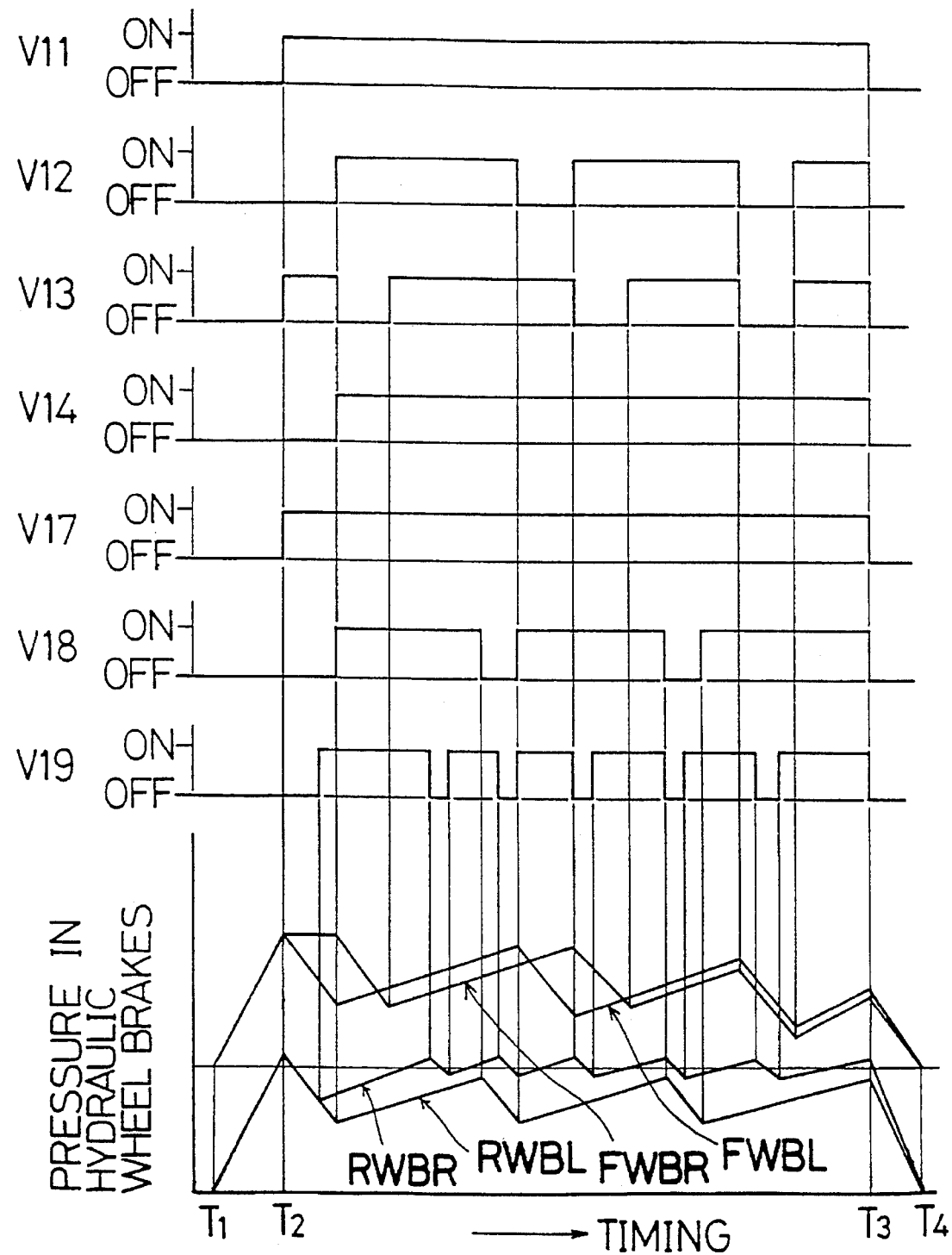
FIG. 9 is a time chart showing a anti-lock control operation of the hydraulic brake device according to the fourth embodiment of the present invention.

The brake pressures of the wheel brakes FWBL, FWBR, RWBL, RWBR vary in response to the operations of the valves V11, V12, V13, V14, V17, V18 and V19 under the anti-lock control condition as shown in FIG. 9.

Figure 10:
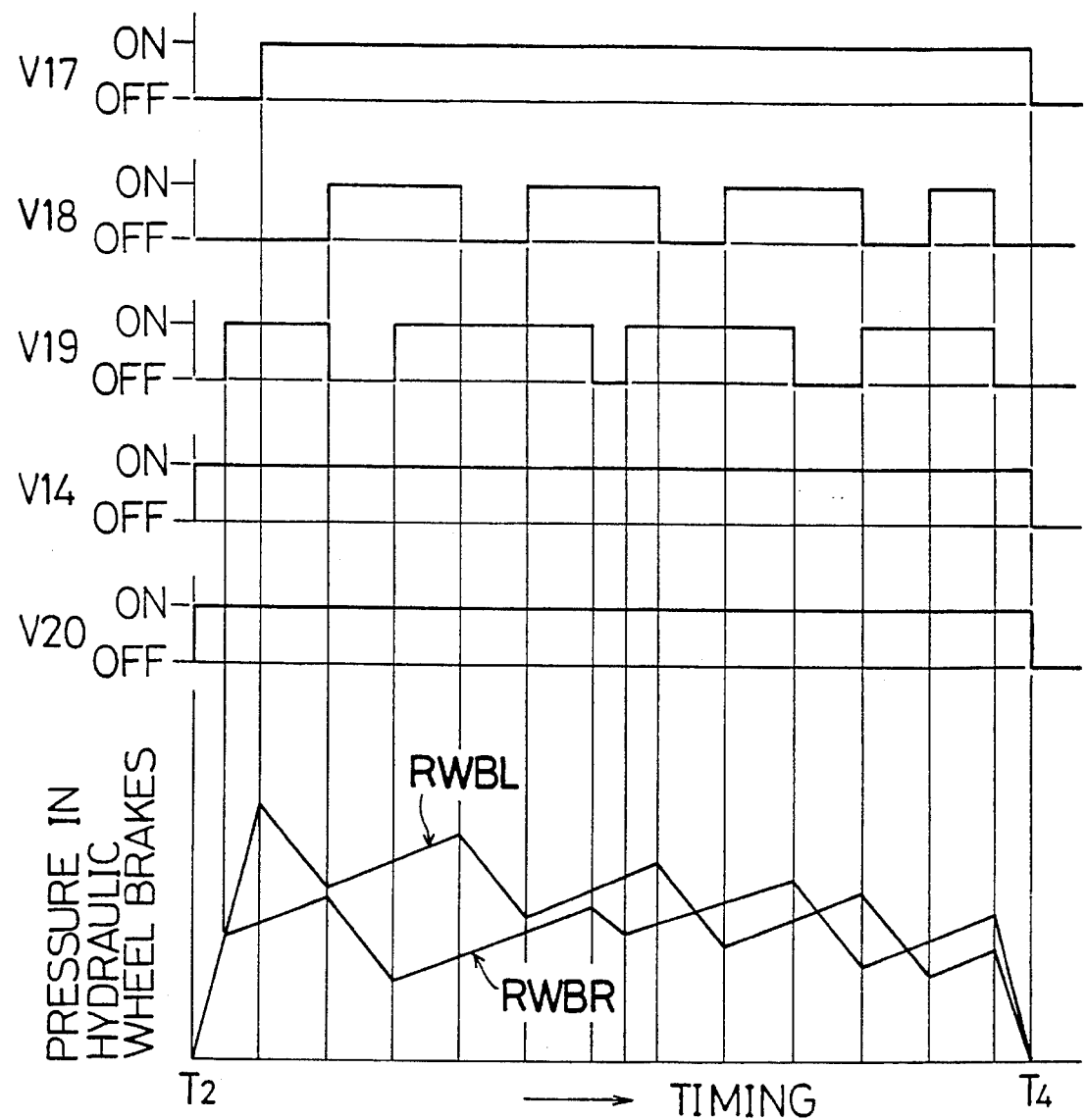
FIG. 10 is a time chart showing a traction control operation of the hydraulic brake device according to the fourth embodiment of the present invention.

The brake pressures of the rear wheel brakes RWBL, RWBR vary in response to the operations of the valves V14, V17, V18, V19 and V20 under the anti-slip control condition as shown in FIG. 10.

Figure 11:
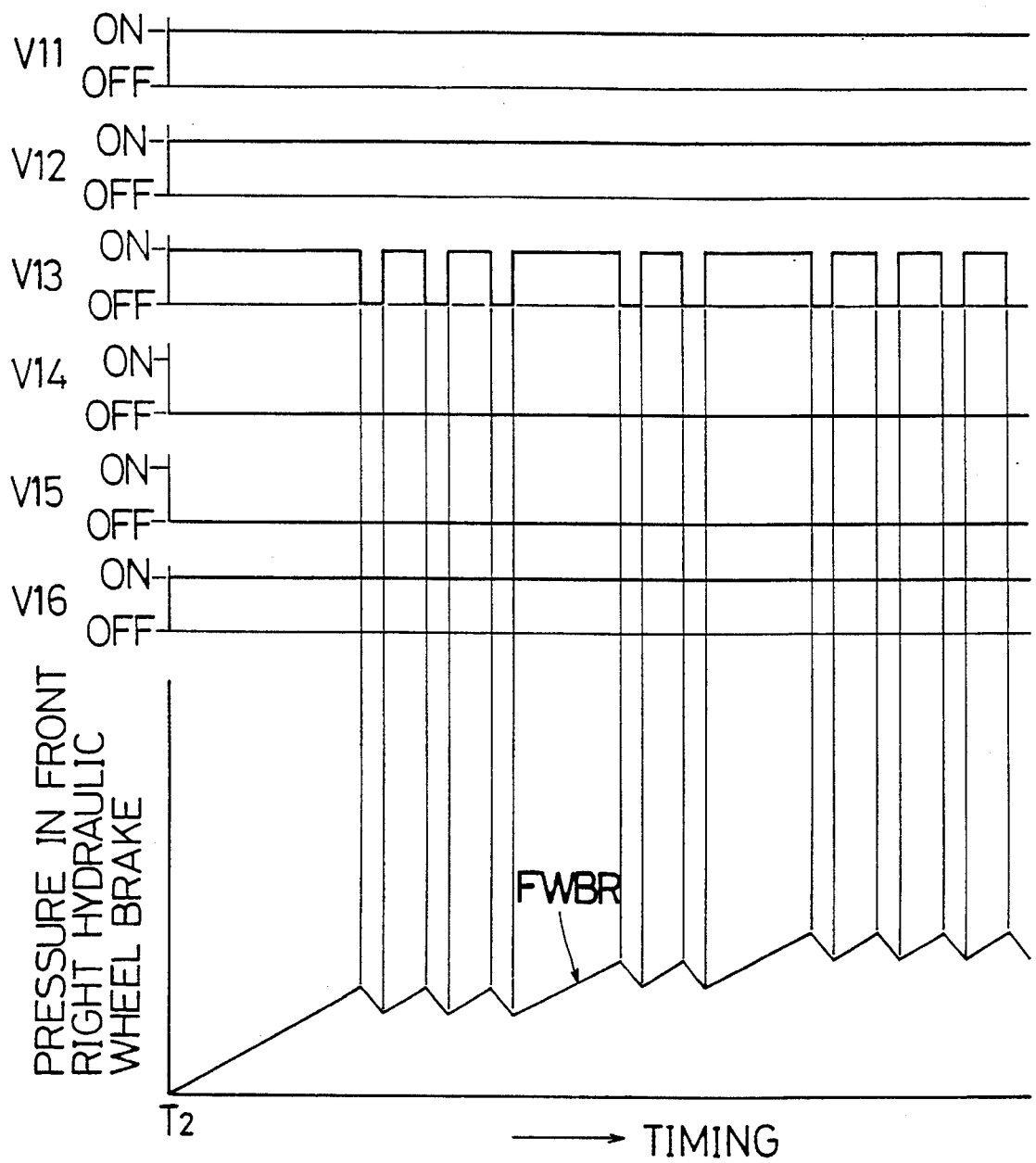
FIG. 11 is a time chart showing a stability control operation of the hydraulic brake device according to the fourth embodiment of the present invention.

The brake pressures of the front left wheel brake FWBL vary in response to the operations of the valves V11, V12, V13, V14, V15 and V16 under the stability control condition as shown in FIG. 11.

T1 and T4 indicate a start timing and a finish timing of the brake operation respectively in FIGS. 9 and 10. T2 and T3 indicate a start timing and a finish timing of the brake pressure control by the electric control device respectively in FIGS. 9 and 10 and 11.

Figure 12:
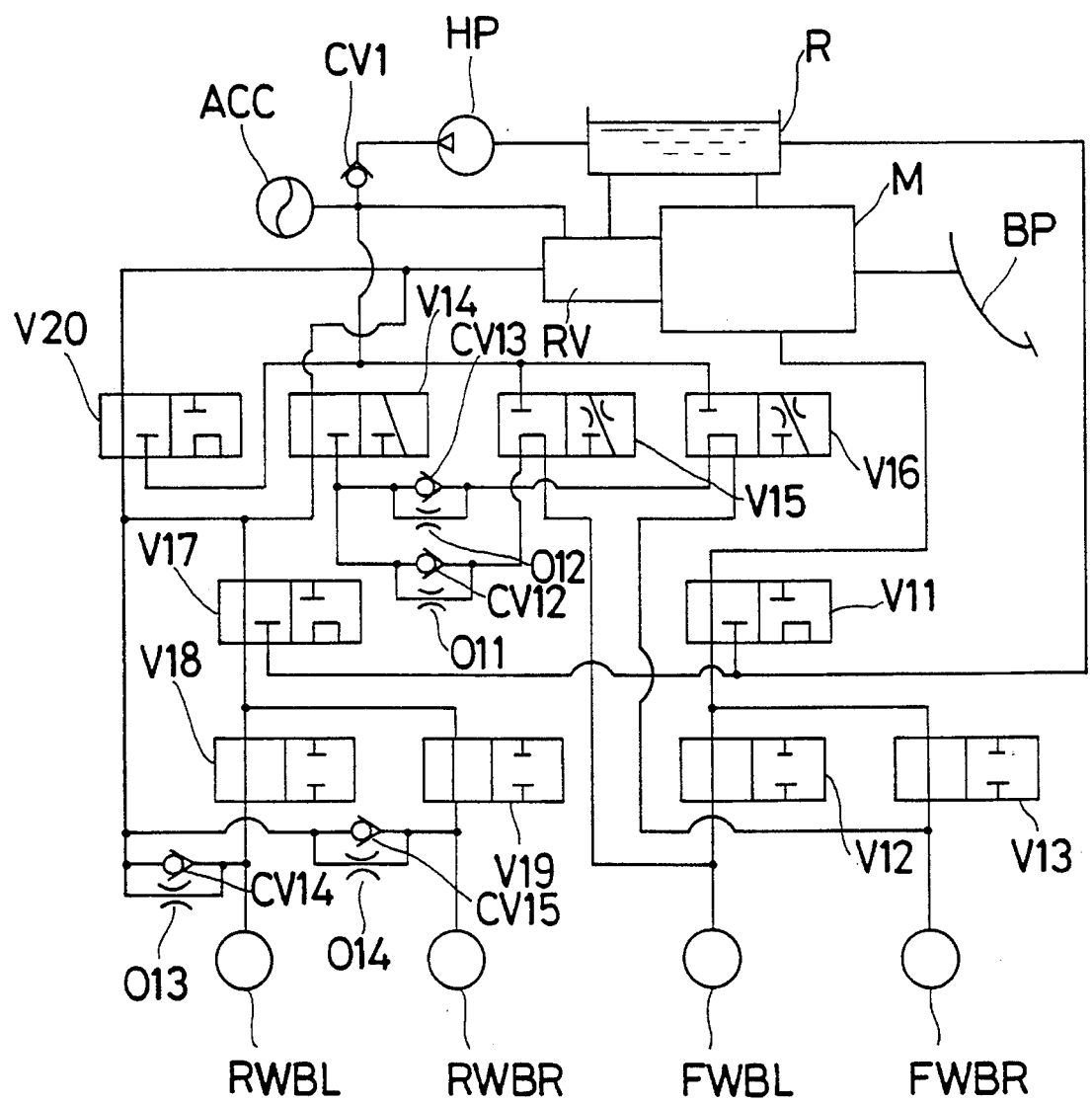
FIG. 12 is a circuit diagram of a hydraulic brake device for a vehicle according to a fifth embodiment of the present invention.

A fifth embodiment of the hydraulic brake device for a vehicle of the invention is shown in FIG. 12. The embodiment shown in FIG. 12 differs from the fourth embodiment in that orifices O11, O12 and check valves CV12, CV13 are disposed in a brake circuit connecting the valve V14 with the valves V15 and V16. The components which are common to both the fourth and fifth embodiments have the same reference numerals and a description of the components which are commonly used in the fourth and fifth embodiments is not repeated.

In accordance with FIG. 12, the brake pressure stored in the accumulator ACC is transmitted to the front wheel brakes FWBL, FWBR through the valves V15, V16 so as not to pass through the orifices O11, O12. However, because each of the valves V15, V16 includes an orifice, the quantity of brake fluid which flows into the front wheel brakes FWBL, FWBR from the accumulator ACC through the valves V15, V16 is smaller than that of the brake fluid which flows into the reservoir R from the front wheel brakes FWBL, FWBR through the valves V12, V13, and V11.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a second hydraulic brake pressure;

an accumulator connected to the hydraulic pump for storing pressurized brake fluid under the second hydraulic brake pressure;

a regulator valve connected to the accumulator for generating a third hydraulic brake pressure corresponding to the magnitude of the operation force of the brake operation member;

a wheel brake for being mounted on a wheel of the vehicle to apply a brake force to the wheel;

a pressure control unit connecting the regulator valve to the wheel brake to supply hydraulic brake pressure to the wheel brake under an anti-lock condition and connecting the wheel brake to the reservoir to discharge brake fluid from the wheel brake to the reservoir under the anti-lock condition, the pressure control unit including an orifice for allowing a restricted flow of brake fluid from the regulator valve to the wheel brake while fluid is being discharged to the reservoir, the brake fluid flowing through the orifice being of such a quantity that when brake fluid is flowing into the wheel brake from the regulator valve and is being discharged to the reservoir from the wheel brake the quantity of brake fluid flowing through the orifice is less than the quantity of brake fluid being discharged from the wheel brake to the reservoir.

2. A hydraulic brake device for a vehicle comprising:

a reservoir for storing brake fluid;

a hydraulic pump for pumping out brake fluid from the reservoir to generate hydraulic brake pressure;

a regulator valve for regulating the hydraulic brake pressure in response to an operation force of a brake operation member of a vehicle;

a front left wheel brake for being mounted on a front left wheel of the vehicle;

a front fight wheel brake for being mounted on a front fight wheel of the vehicle;

an actuator for increasing the brake pressure in the front left wheel brake and the front fight wheel brake by supplying brake fluid from either the regulator valve or the hydraulic pump to the front left wheel brake and the front fight wheel brake and for decreasing the brake pressure in the front left wheel brake and the front right wheel brake by discharging brake fluid from the front left wheel brake and the front right wheel brake to the reservoir, said actuator including a first orifice for allowing a restricted flow of brake fluid from the regulator valve to the front left wheel brake while brake fluid is being discharged from the front left wheel brake to the reservoir, a second orifice for allowing a restricted flow of brake fluid from the regulator valve to the front right wheel brake while brake fluid is being discharged from the front fight wheel brake to the reservoir, first valve means for disconnecting the first orifice from the regulator valve and connecting the first orifice to the hydraulic pump, and second valve means for disconnecting the second orifice from the regulator valve and connecting the second orifice to the hydraulic pump.

3. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a hydraulic pressure;

a regulator valve connected to the hydraulic pump for generating a second hydraulic brake pressure corresponding to the magnitude of the operation force of the brake operation member;

a wheel brake for applying a brake force to a wheel of the vehicle;

a pressure control unit connecting the wheel brake to the master cylinder, the reservoir and the regulator valve to control brake fluid flow into the reservoir from the wheel brake and brake fluid flow into the wheel brake from the regulator valve under an anti-lock control condition, the pressure control unit including a first valve device for disconnecting the wheel brake from the master cylinder and connecting the wheel brake to the reservoir under the anti-lock control condition, a second valve device for selectively disconnecting the first valve device from the wheel brake under the anti-lock control condition, a third valve device for connecting the wheel brake to the regulator valve to bypass the first and second valve devices under the anti-lock control condition, and an orifice for restricting a quantity of brake fluid which flows into the wheel brake from the regulator valve so that when brake fluid flows into the wheel brake from the regulator valve and into the reservoir from the wheel brake the quantity of brake fluid flowing through the orifice to the wheel brake is smaller than the quantity of brake fluid which flows into the reservoir from the wheel brake through the first and second valve devices.

4. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a second hydraulic brake pressure;

a regulator valve connected to the hydraulic pump for generating a third hydraulic brake pressure corresponding to the magnitude of the operation force of the brake operation member;

a first wheel brake for applying a brake force to a first wheel of the vehicle;

a first pressure control unit connecting the first wheel brake to the master cylinder, the reservoir and the regulator valve to control brake fluid flow into the reservoir from the first wheel brake and brake fluid flow into the first wheel brake from the regulator valve under an anti-lock control condition, a second wheel brake for applying a brake force to a second wheel of the vehicle;

a second pressure control unit connecting the second wheel brake to the master cylinder, the reservoir and the regulator valve to control brake fluid flow into the reservoir from the second wheel brake and brake fluid flow into the second wheel brake from the regulator valve under the anti-lock control condition, the first pressure control unit including a first valve device for disconnecting the first wheel brake from the master cylinder and connecting the first wheel brake to the reservoir under the anti-lock control condition, a second valve device for selectively disconnecting the first valve device from the first wheel brake under the anti-lock control condition, a third valve device for connecting the first wheel brake to the regulator valve to bypass the first and second valve devices while also disconnecting the second wheel brake from the regulator valve under the anti-lock control condition, and a first orifice for restricting a quantity of brake fluid which flows into the first wheel brake from the regulator valve in order that when brake fluid flows into the first wheel brake from the regulator valve and into the reservoir from the first wheel brake the quantity of brake fluid flowing through the first orifice is smaller than the quantity of brake fluid which flows into the reservoir from the first wheel brake through the first and second valve devices, the second pressure control unit including a fourth valve device for selectively connecting the second wheel brake to the reservoir under the anti-lock control condition and a second orifice for connecting the second wheel brake to bypass the third valve device under the anti-lock control condition and restricting a quantity of brake fluid which flows into the second wheel brake from the regulator valve in order that when brake fluid flows into the second wheel brake from the regulator valve and into the reservoir from the second wheel brake the quantity of brake fluid flowing through the second orifice is smaller than the quantity of brake fluid which flows into the reservoir from the second wheel brake through the fourth valve devices.

5. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a second hydraulic brake pressure;

a regulator valve connected to the hydraulic pump for generating a third hydraulic brake pressure corresponding to the magnitude of the operation force of the brake operation member;

a first wheel brake for applying a brake force to a first wheel of the vehicle;

a first pressure control unit connecting the first wheel brake to the master cylinder, the reservoir and the regulator valve to control brake fluid flow into the reservoir from the first wheel brake and brake fluid flow into the first wheel brake from the regulator valve under an anti-lock control condition, a second wheel brake for applying a brake force to a second wheel of the vehicle;

a second pressure control unit connecting the second wheel brake to the master cylinder, the reservoir and the regulator valve to control brake fluid flow into the reservoir from the second wheel brake and brake fluid flow into the second wheel brake from the regulator valve under the anti-lock control condition, the first pressure control unit including a first valve device for disconnecting the first wheel brake from the master cylinder and connecting the first wheel brake to the reservoir under the anti-lock control condition, a second valve device for selectively disconnecting the first valve device from the first wheel brake under the anti-lock control condition, a third valve device for connecting the first wheel brake to the regulator valve to bypass the first and second valve devices under the anti-lock control condition, and a first orifice for restricting a quantity of brake fluid which flows into the first wheel brake from the regulator valve so that when brake fluid flows into the first wheel brake from the regulator and into the reservoir from the first wheel brake the quantity of brake fluid flowing through the first orifice to the first wheel brake is smaller than the quantity of brake fluid which flows into the reservoir from the first wheel brake through the first and second valve devices, the second pressure control unit including a fourth valve device for disconnecting the second wheel brake from the regulator valve and connecting the second wheel brake to the reservoir under the anti-lock control condition, a fifth valve device for selectively disconnecting the fourth valve device from the second wheel brake under the anti-lock control condition, and a second orifice for connecting the second wheel brake to the regulator valve by bypassing the fourth and fifth valve devices under the anti-lock control condition and restricting a quantity of brake fluid which flows into the second wheel brake from the regulator valve so that when brake fluid flows into the second wheel brake from the regulator valve and into the reservoir from the second wheel brake the quantity of brake fluid flowing into the second wheel brake by way of the second orifice is smaller than the quantity of brake fluid which flows into the reservoir from the second wheel brake through the fourth and fifth valve devices.

6. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a second hydraulic brake pressure;

an accumulator connected to the hydraulic pump for storing pressurized brake fluid under the second hydraulic brake pressure;

a regulator valve connected to the accumulator for generating a third hydraulic brake pressure corresponding to the magnitude of the operation force of the brake operation member;

a from left wheel brake for being mounted on a from left wheel of the vehicle;

a from right wheel brake for being mounted on a from right wheel of the vehicle;

a first actuator for increasing and decreasing the brake pressure in the front left wheel brake and the from right wheel brake under a brake pressure control condition including an anti-lock control condition, the first actuator including a first valve device for disconnecting the front left wheel brake and front right wheel brake from the master cylinder and connecting the front left wheel brake and front right wheel brake to the reservoir under the brake pressure control condition, a second valve device for selectively disconnecting the first valve device from the front left wheel brake under the brake pressure control condition, a third valve device for selectively disconnecting the first valve device from the front right wheel brake under the brake pressure control condition, a fourth valve device for connecting the front left wheel brake to the regulator valve by bypassing the first and second valve devices and connecting the front right wheel brake to the regulator valve by bypassing the first and third valve devices under the brake pressure control condition, a first orifice for restricting a quantity of brake fluid which flows into the front left wheel brake from the regulator valve so that when brake fluid flows into the front left wheel brake from the regulator valve and into the reservoir from the front left wheel brake the quantity of brake fluid flowing into the front left wheel brake from the regulator valve is smaller than the quantity of brake fluid which flows into the reservoir from the front left wheel brake through the first and second valve devices, a second orifice for restricting a quantity of brake fluid which flows into the front right wheel brake from the regulator valve so that when brake fluid flows into the front right wheel brake from the regulator valve and into the reservoir from the front right wheel brake the quantity of brake fluid flowing into the front right wheel brake from the regulator valve is smaller than the quantity of brake fluid which flows into the reservoir from the front right wheel brake through the first and third valve devices, and a fifth valve device for selectively disconnecting the first orifice from the fourth valve device and selectively connecting the first orifice to the accumulator, and sixth valve device for disconnecting the second orifice from the fourth valve device and connecting the second orifice to the accumulator under the brake pressure control condition.

7. A hydraulic brake device for a vehicle as recited in claim 6, further comprising:

a rear left wheel brake for being mounted on a rear left wheel of the vehicle;

a rear right wheel brake for being mounted on a rear right wheel of the vehicle;

a second actuator for increasing and decreasing the brake pressure in the rear left wheel brake and the rear right wheel brake under a rear brake pressure control condition including an anti-lock control condition, the second actuator including a seventh valve device for continuously disconnecting the rear left wheel brake and rear right wheel brake from the master cylinder and connecting the rear left wheel brake and rear right wheel brake to the reservoir under the rear brake pressure control condition, an eighth valve device for selectively disconnecting the seventh valve device from the rear left wheel brake under the rear brake pressure control condition, a ninth valve device for selectively disconnecting the seventh valve device from the rear right wheel brake under the rear brake pressure control condition, a third orifice for restricting a quantity of brake fluid which flows into the rear left wheel brake from the regulator valve to bypass the seventh and eighth valve devices so that when brake fluid flows into the rear left wheel brake from the regulator valve and into the reservoir from the rear left wheel brake the quantity of brake fluid flowing through the third orifice is smaller than the quantity of brake fluid which flows into the reservoir from the rear left wheel brake through the eighth valve device and seventh valve device, a fourth orifice for restricting a quantity of brake fluid which flows into the rear right wheel brake from the regulator valve to bypass the seventh and ninth valve devices so that when brake fluid flows into the rear right wheel brake from the regulator valve and into the reservoir from the rear right wheel brake the quantity of brake fluid flowing through the fourth orifice is smaller than the quantity of brake fluid which flows into the reservoir from the rear right wheel brake through the ninth valve device and seventh valve device, and a tenth valve device for selectively connecting the seventh valve device, the third orifice and the fourth orifice to the accumulator under the rear brake pressure control condition.

8. A hydraulic brake device for a vehicle comprising:

a reservoir for storing brake fluid;

a master cylinder connected to the reservoir for generating a first hydraulic brake pressure corresponding to a magnitude of an operation force of a brake operation member of the vehicle;

a hydraulic pump connected to the reservoir for pumping out brake fluid from the reservoir to generate a second hydraulic brake pressure;

an accumulator connected to the hydraulic pump for storing pressurized brake fluid under the second hydraulic brake pressure;

a regulator valve connected to the accumulator for generating a third hydraulic brake pressure corresponding to the magnitude of the operation force of the brake operation member;

a front left wheel brake for being mounted on a front left wheel of the vehicle;

a front right wheel brake for being mounted on a front right wheel of the vehicle;

a first actuator for increasing and decreasing the front left wheel brake and the front right wheel brake under a front brake pressure control condition including an anti-lock control condition, the first actuator including a first valve device for disconnecting the front left wheel brake and front right wheel brake from the master cylinder and connecting the front left wheel brake and front right wheel brake to the reservoir under the front brake pressure control condition, a second valve device for selectively disconnecting the first valve device from the front left wheel brake under the front brake pressure control condition, a third valve device for selectively disconnecting the first valve device from the front right wheel brake under the front brake pressure control condition, a fourth valve device for connecting the front left wheel brake to the regulator valve to bypass the first and second valve devices and connecting the front right wheel brake to the regulator valve to bypass the first and third valve devices under the from brake pressure control condition, a first orifice for restricting a quantity of brake fluid which flows into the front left wheel brake from the regulator valve so that when brake fluid flows into the front left wheel brake from the regulator valve and into the reservoir from the from left wheel brake the quantity of brake fluid flowing through the first orifice is smaller than the quantity of brake fluid which flows into the reservoir from the front left wheel brake through the first and second valve devices, a second orifice for restricting a quantity of brake fluid which flows into the front right wheel brake from the regulator valve so that when brake fluid flows into the front right wheel brake from the regulator and into the reservoir from the front right wheel brake the quantity of brake fluid flowing through the second orifice is smaller than a quantity of brake fluid which flows into the reservoir from the front right wheel brake through the first and third valve devices, a fifth valve device for selectively disconnecting the front left wheel brake from the first orifice and selectively connecting the front left wheel brake to the accumulator under the front brake pressure control condition, and a sixth valve device for selectively disconnecting the front right wheel brake from the second orifice and selectively connecting the front right wheel brake to the accumulator under the front brake pressure control condition, each of the fifth and sixth valve devices including a third orifice for restricting a quantity of brake fluid which flows into the front left wheel brake and the front right wheel brake from the accumulator so that when brake fluid flows into the front left wheel brake and the front right wheel brake from the accumulator and into the reservoir from the front left wheel brake and the front right wheel brake the quantity of brake fluid flowing through the third orifice is smaller than the quantity of brake fluid flowing into the reservoir from the front left wheel brake and the front right wheel brake through the first valve device, the second valve device and the third valve device.

9. A hydraulic brake device for a vehicle as recited in claim 8, further comprising:

a rear left wheel brake for being mounted on a rear left wheel of the vehicle;

a rear right wheel brake for being mounted on a rear right wheel of the vehicle;

a second actuator for increasing and decreasing the rear left wheel brake and the rear right wheel brake under a rear brake pressure control condition including an anti-lock control condition, the second actuator including a seventh valve device for disconnecting the rear left wheel brake and rear right wheel brake from the master cylinder and connecting the rear left wheel brake and rear right wheel brake to the reservoir under the rear brake pressure control condition, a eighth valve device for selectively disconnecting the seventh valve device from the rear left wheel brake under the rear brake pressure control condition, a ninth valve device for selectively disconnecting the seventh valve device from the rear right wheel brake under the rear brake pressure control condition, a fourth orifice for restricting a quantity of brake fluid which flows into the rear left wheel brake from the regulator valve to bypass the seventh and eighth valve devices so that when brake fluid flows into the rear left wheel brake from the regulator valve and into the reservoir form the rear left wheel brake the quantity of brake fluid flowing through the fourth orifice is smaller than the quantity of brake fluid which flows into the reservoir from the rear left wheel brake through the eighth valve device and seventh valve device, a fifth orifice for restricting a quantity of brake fluid which flows into the rear right wheel brake from the regulator valve to bypass the seventh and ninth valve devices so that when brake fluid flows into the rear right wheel brake from the regulator valve and into the reservoir from the rear right wheel brake the quantity of brake fluid flowing through the fifth orifice is smaller than the quantity of brake fluid which flows into the reservoir from the rear right wheel brake through the ninth valve device and seventh valve device, and a tenth valve device for selectively connecting the seventh valve device, the fourth orifice and the fifth orifice to the accumulator under the rear brake pressure control condition.

\* \* \* \* \*